(12) United States Patent
Salim

(10) Patent No.: US 12,432,032 B2
(45) Date of Patent: Sep. 30, 2025

(54) CHANNEL STATE INFORMATION ACQUISITION

(71) Applicant: JRD Communication (Shenzhen) LTD., Guangdong (CN)

(72) Inventor: Umer Salim, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 772 days.

(21) Appl. No.: 17/623,948

(22) PCT Filed: Jun. 30, 2020

(86) PCT No.: PCT/CN2020/099178
§ 371 (c)(1),
(2) Date: Dec. 30, 2021

(87) PCT Pub. No.: WO2021/000849
PCT Pub. Date: Jan. 7, 2021

(65) Prior Publication Data
US 2022/0360403 A1   Nov. 10, 2022

Related U.S. Application Data

(60) Provisional application No. 62/869,486, filed on Jul. 1, 2019.

(51) Int. Cl.
*H04L 5/00* (2006.01)
*H04W 4/40* (2018.01)

(52) U.S. Cl.
CPC .......... *H04L 5/0051* (2013.01); *H04L 5/0053* (2013.01); *H04L 5/0078* (2013.01); *H04W 4/40* (2018.02)

(58) Field of Classification Search
CPC ... H04L 5/0051; H04L 5/0053; H04L 5/0078; H04W 4/40
See application file for complete search history.

(56) References Cited

U.S. PATENT DOCUMENTS

| 2015/0358981 A1 | 12/2015 | Chae et al. |
| 2020/0022116 A1 | 1/2020 | Liu et al. |
| 2022/0201528 A1* | 6/2022 | Shin ...................... H04L 5/0053 |

FOREIGN PATENT DOCUMENTS

| CN | 103108405 | 5/2013 |
| CN | 107733595 | 2/2018 |

(Continued)

OTHER PUBLICATIONS

International Search Report and the Written Opinion Dated Sep. 28, 2020 From the International Searching Authority Re. Application No. PCT/CN2020/099178. (8 Pages).

(Continued)

*Primary Examiner* — Rhonda L Murphy

(57) ABSTRACT

Methods of allocating resources for Channel State Information, CSI, transmission, comprising the steps of receiving, from a transmitter User Equipment, a request for resources for transmission of a Channel State Information Reference Signal, CSI-RS; determining, in response to receiving the request for transmission of a CSI-RS, a first resource allocation for CSI-RS transmission; determining, in response to receiving the request for transmission of a CSI-RS, a second resource allocation for a CSI report transmission; and transmitting, to the transmitter User Equipment, the first resource allocation and the second resource allocation.

5 Claims, 8 Drawing Sheets

(56) References Cited

FOREIGN PATENT DOCUMENTS

| CN | 109644455 | 4/2019 |
|----|-----------|--------|
| EP | 3890246 | 10/2021 |
| WO | WO 2017/188769 | 11/2017 |
| WO | WO 2018/177141 | 10/2018 |
| WO | WO 2018/231111 | 12/2018 |

OTHER PUBLICATIONS

NTT Docomo, "NR Sidelink Physical Layer Procedure", 3GPP TSG RAN WG1 #97 Meeting, Reno, NV, USA, May 13-17, 2019, R1-1906209, May 13, 2019.

Samsung, "On Physical Layer Procedures for NR V2X", 3GPP TSG RAN WG1 #97 Meeting, Reno, USA, May 13-17, 2019, R1-1906941, May 13, 2019.

Supplementary European Search Report and the European Search Opinion Dated Jun. 20, 2023 From the European Patent Office Re. Application No. 20835220.3. (7 Pages).

Notification of Office Action and Search Report Dated Oct. 20, 2022 From the State Intellectual Property Office of the People's Republic of China Re. Application No. 202080009916.7 and Its Translation Into English. ( 52 Pages).

\* cited by examiner

CHANNEL STATE INFORMATION ACQUISITION

RELATED APPLICATIONS

This application is a National Phase of PCT Patent Application No. PCT/CN2020/099178 having International filing date of Jun. 30, 2020, which claims the benefit of priority under 35 USC § 119 (e) of U.S. Provisional Patent Application No. 62/869,486 filed on Jul. 1, 2019. The contents of the above applications are all incorporated by reference as if fully set forth herein in their entirety.

FIELD AND BACKGROUND OF THE INVENTION

The following disclosure relates to Channel State Information acquisition at a User Equipment.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN &CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of 10−5 or 10−6 has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of allocating resources for Channel State Information, CSI, transmission. The method comprises receiving, from a transmitter User Equipment, a request for resources for transmission of a Channel State Information Reference Signal, CSI-RS; determining, in response to receiving the request for transmission of a CSI-RS, a first resource allocation for CSI-RS transmission; determining, in response to receiving the request for transmission of a CSI-RS, a second resource allocation for a CSI report transmission; and transmitting, to the transmitter User Equipment, the first resource allocation and the second resource allocation.

There is provided a method of receiving Channel State Information, CSI, at a transmitter User Equipment from a receiver User Equipment. The method comprises: transmitting, to a base station, a request for resources for transmission of a Channel State Information Reference Signal, CSI-RS; receiving, from the base station, a first resource allocation for CSI-RS transmission and a second resource allocation for a CSI report transmission; transmitting, to the receiver User Equipment using the first resource allocation, a CSI-RS and an indication of the second resource allocation; and receiving, from the receiver User Equipment using the second resource allocation, a CSI report.

There is provided a method of transmitting Channel State Information, CSI, from a receiver User Equipment. The method comprises: receiving, from a transmitter User Equipment, a Channel State Information Reference Signal, CSI-RS, and an indication of a resource allocation for a CSI report transmission; and transmitting, to the transmitter User Equipment and in response to receiving the CSI-RS, a CSI report using the resource allocation for a CSI report transmission. The method may comprise determining the CSI report based on the CSI-RS.

Transmitting the first resource allocation and the second resource allocation to the transmitter User Equipment may comprise transmitting a single DCI configured to comprise a plurality of resource schedulings. Advantageously, the transmitter User Equipment does not have to blindly decode a variety of DCI format, which would otherwise lead to a large processing burden.

Transmitting the first resource allocation and the second resource allocation to the transmitter User Equipment may comprise transmitting DCI formats arranged to schedule multiple time-frequency resources.

Transmitting the first resource allocation and the second resource allocation to the receiver User Equipment may comprise transmitting SCI formats arranged to schedule multiple time-frequency resources.

There is provided a method of allocating resources for Channel State Information (CSI) transmission. The method comprises: receiving a request for resources for transmission of a Channel State Information Reference Signal (CSI-RS); determining, in response to receiving the request for transmission of a CSI-RS, a first resource allocation for CSI-RS transmission; determining, in response to receiving the request for transmission of a CSI-RS, a second resource allocation for a CSI report transmission; transmitting, to a transmitter User Equipment, the first resource allocation; and transmitting, to a receiver User Equipment, the second resource allocation. The method may comprise transmitting the second resource allocation without receiving a request for resources from the receiver User Equipment.

There is provided a method of transmitting Channel State Information (CSI) from a receiver User Equipment. The method comprises: receiving, from a transmitter User Equipment, a Channel State Information Reference Signal (CSI-RS); receiving, from a base station and without transmitting a request for resources to the base station, a resource allocation for CSI report transmission; and transmitting, to the transmitter User Equipment, the CSI report using the received resource allocation. The method may comprise determining the CSI report based on the CSI-RS.

There is provided a method of allocating resources for Channel State Information (CSI) transmission. The method comprises: receiving a request for resources for transmission of a Channel State Information Reference Signal (CSI-RS); determining, in response to receiving the request for transmission of a CSI-RS, a first resource allocation for CSI-RS transmission; determining, in response to receiving the request for transmission of a CSI-RS, a second resource allocation for a CSI report transmission; transmitting, to a transmitter User Equipment, the first resource allocation; and transmitting the second resource allocation. The method may comprise transmitting the second resource allocation to the transmitter User Equipment or to a receiver User Equipment. The method may comprise transmitting the second resource allocation without receiving a request for resources from the receiver User Equipment.

The methods above enable grant of resources for the transmission of CSI-RS and CSI report in dynamic-grant-based communication without having to request the base station to grant the resources for a CSI report and receiving them in an explicit DCI. This allows the fast transmission of a CSI report from the receiver User Equipment.

There is provided a method of transmitting Channel State Information (CSI), from a receiver User Equipment. The method comprises: receiving, from a transmitter User Equipment, a Channel State Information Reference Signal (CSI-RS), using a periodically allocated resource of the transmitter User Equipment; transmitting, to a base station and in response to receiving the CSI-RS, a request for resources for CSI report transmission; receiving, from the base station, a resource allocation for CSI report transmission; and transmitting, to the transmitter User Equipment, the CSI report using the received resource allocation. The method may comprise determining the CSI report based on the CSI-RS.

There is provided a method of transmitting Channel State Information (CSI) from a receiver User Equipment. The method comprises: receiving, from a transmitter User Equipment, a Channel State Information Reference Signal (CSI-RS); and transmitting, to the transmitter User Equipment and in response to receiving the CSI-RS, a CSI report using a periodically allocated resource of the receiver User Equipment towards the transmitter User Equipment. The method may comprise determining the CSI report based on the CSI-RS.

There is provided a method of receiving Channel State Information (CSI) at a transmitter User Equipment from a receiver User Equipment. The method comprises: transmitting, to a base station, a request for resources for transmission of a Channel State Information Reference Signal (CSI-RS); receiving, from the base station, a resource allocation for CSI-RS transmission; transmitting, to the receiver User Equipment, a CSI-RS using the received resource allocation; and receiving, from the receiver User Equipment, a CSI report using a periodically allocated resource of the receiver User Equipment.

There is provided a method of transmitting Channel State Information (CSI) from a receiver User Equipment. The method comprises: receiving, from a transmitter User Equipment, a Channel State Information Reference Signal (CSI-RS) using a periodically allocated resource of the transmitter User Equipment; and transmitting, to the transmitter User Equipment and in response to receiving the CSI-RS, a CSI report using a periodically allocated resource of the receiver User Equipment. The method may comprise determining the CSI report based on the CSI-RS.

There is provided a method of receiving Channel State Information (CSI) at a transmitter User Equipment from a receiver User Equipment. The method comprises: transmitting, to the receiver User Equipment, a Channel State Information Reference Signal (CSI-RS) using a periodically allocated resource of the transmitter User Equipment; and receiving, from the receiver User Equipment, a CSI report. Receiving the CSI report may comprise receiving using a periodically allocated resource of the receiver User Equipment. Receiving the CSI report may comprise receiving using a dynamically allocated resource.

The methods discussed above minimise resource overhead and enable the CSI to be received at the transmitter User Equipment with lower latency. This results in up-to-date CSI being available at the transmitter User Equipment due to reduced number of requests in the CSI acquisition processes. Accordingly, link adaptation may be much more efficient and may result in significant spectral efficiency improvement.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE SEVERAL VIEWS OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DESCRIPTION OF SPECIFIC EMBODIMENTS OF THE INVENTION

Those skilled in the art will recognise and appreciate that the specifics of the examples described are merely illustrative of some embodiments and that the teachings set forth herein are applicable in a variety of alternative settings.

Figure 1:
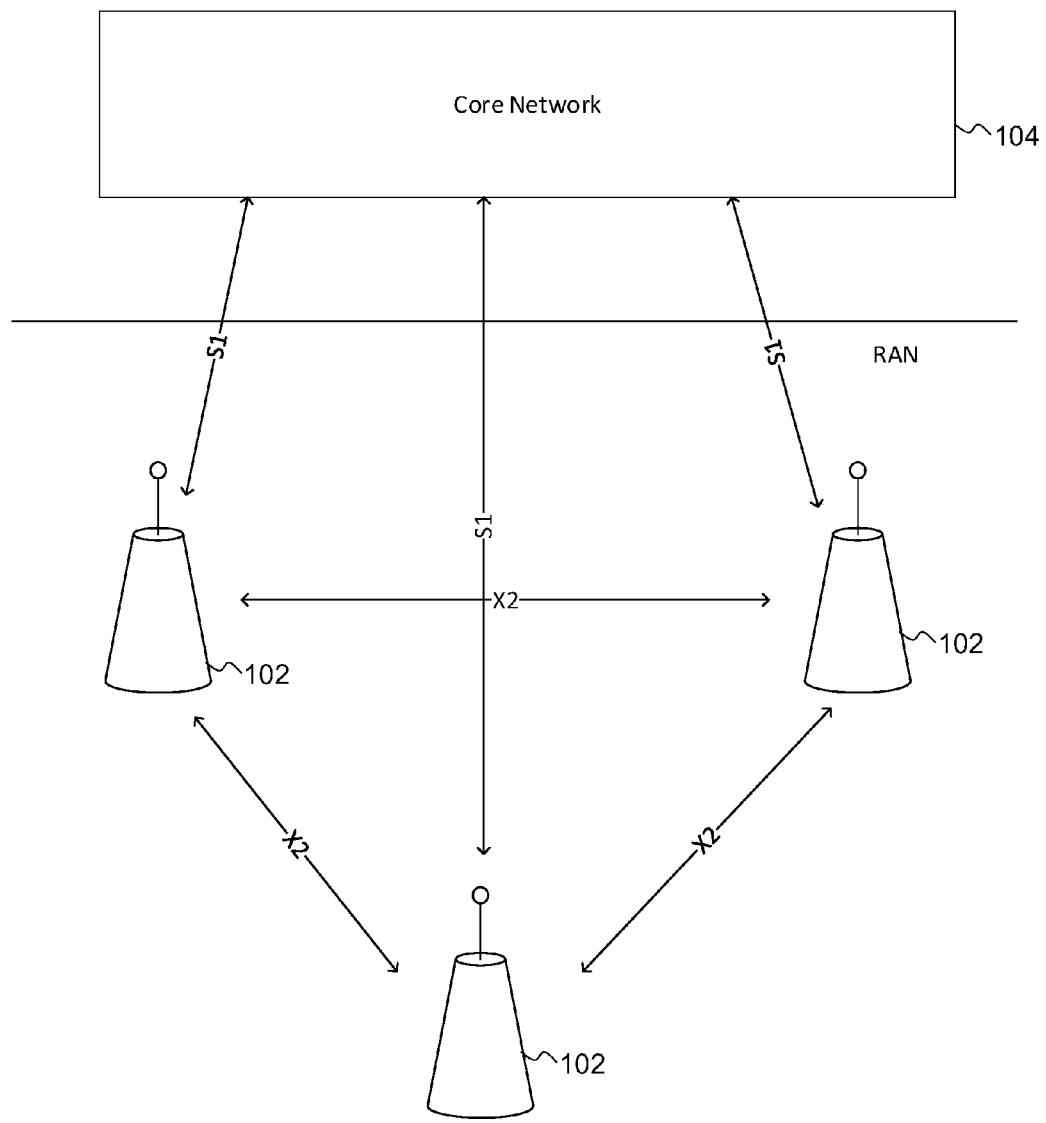
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the

RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

1) Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.
2) Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
3) Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
4) Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
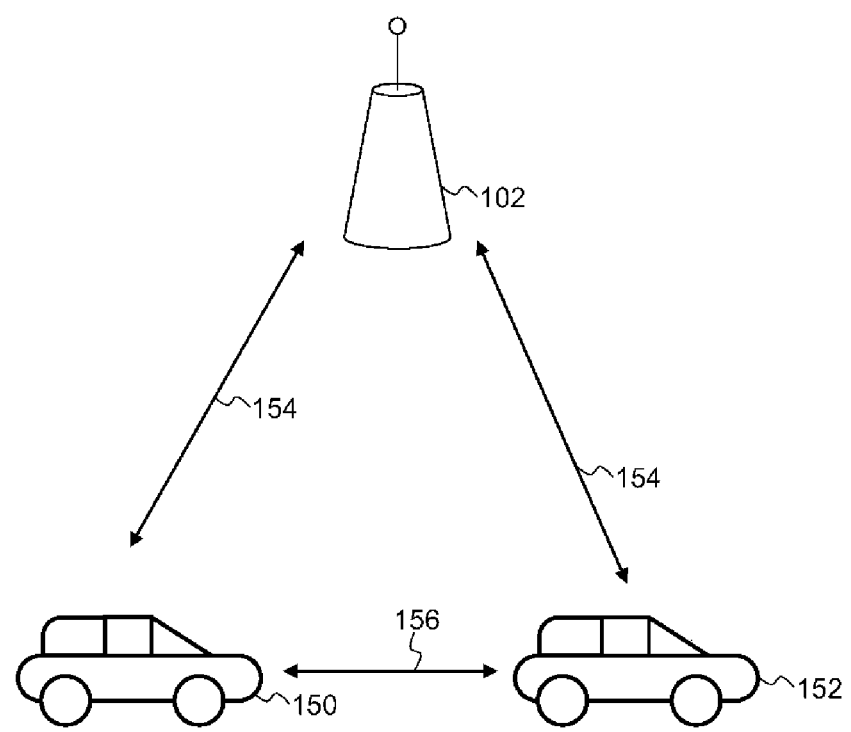
FIG. 2 shows selected elements in a Radio Area Network of the cellular wireless communication network of FIG. 1.

FIG. 2 illustrates a base station 102 forming a RAN, and a transmitter (Tx) UE 150 and a receiver (Rx) UE 152 in the RAN. The base station 102 is arranged to wirelessly communicate over respective connections 154 with each of the Tx UE 150 and the Rx UE 152. The Tx UE 150 and the Rx UE 152 are arranged to wirelessly communicate with each other over a sidelink 156.

In V2X, there are two modes of resource allocation depending on whether the UEs are within coverage of a cellular network. In Mode 1, the V2X communication is operating in-coverage of the base stations (eg eNBs or gNBs). All the scheduling and the resource assignments may be made by the base stations. Mode 2 applies when the V2X services operate out-of-coverage of cellular base stations. Here the UEs need to schedule themselves. For fair utilization, sensing-based resource allocation is generally adopted at the UEs.

In wireless communications, channel state information (CSI) refers to known channel properties of a communication link. This information describes how a signal propagates from a transmitter UE to a receiver UE and represents the combined effect of, for example, scattering, fading, and power decay with distance. The CSI makes it possible to adapt transmissions to current channel conditions, which may be used to make the transmissions more efficient and robust. For example, CSI may be used by a transmitter UE for the purpose of link adaptation, such that a suitable modulation and coding scheme (MCS) is selected at the transmitter UE which is favourably decodable at the receiver UE. For multi-layer transmissions, when the transmitter UE sends multiple spatial streams, the rate on each individual stream needs to be suitably selected. For example, when a transmitter UE is employing multiple transmit antennas, CSI can be used to optimise beam-forming to a receiver UE or to enable spatial multiplexing to facilitate multi-layer decoding. Generally, CSI at a receiver UE is estimated, in general by making use of a reference symbol from a transmitter UE, and the estimated CSI is fed back to the transmitter UE.

Figure 3:
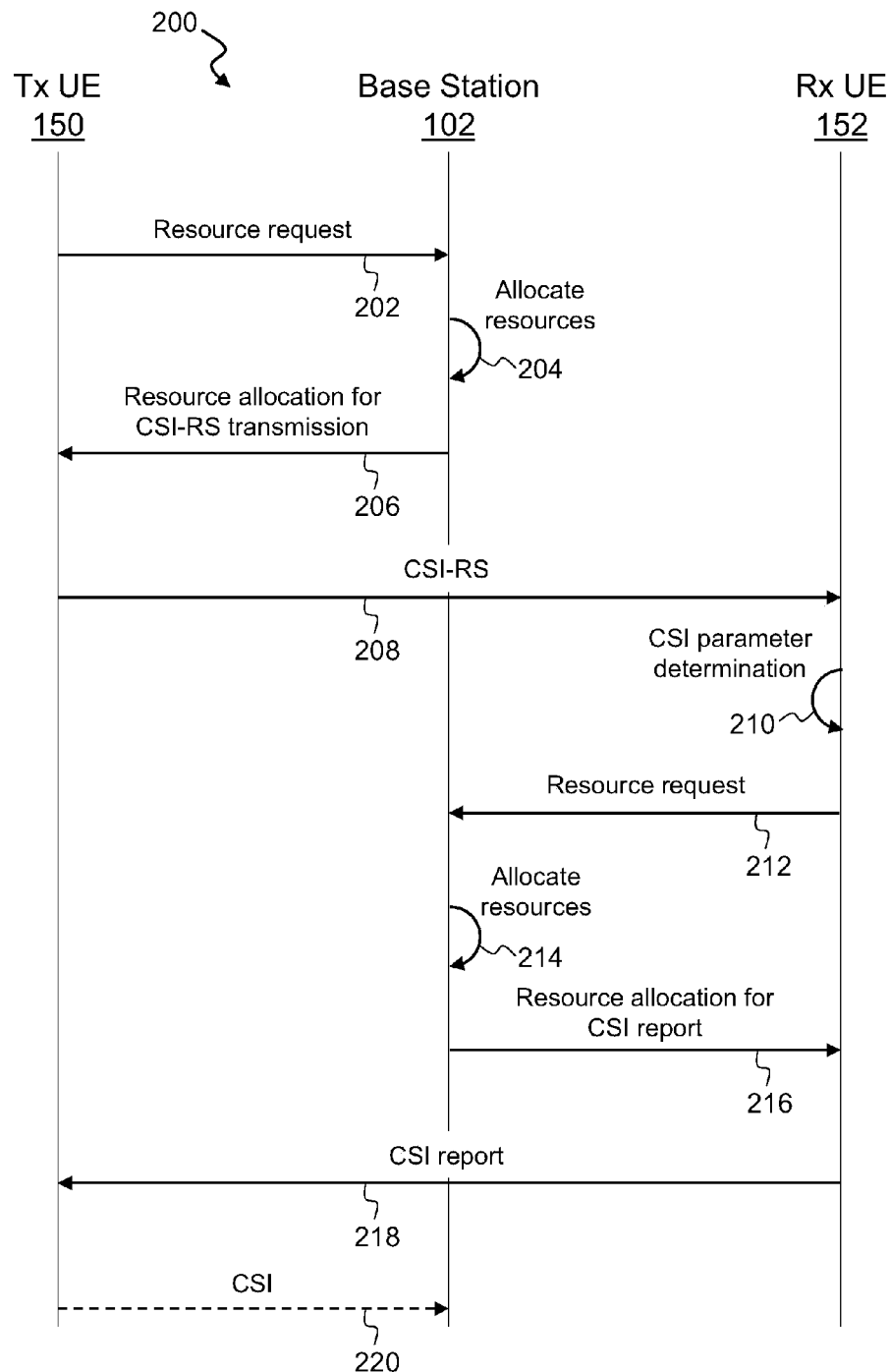
FIG. 3 shows a dataflow in a process of CSI acquisition.

Typically, in Mode 1, resource allocation for CSI acquisition is determined by a base station 102. With reference to FIG. 3, a CSI acquisition process 200 comprises the Tx UE 150 sending, at step 202, a request to the base station 102 for resources for CSI Reference Signal (CSI-RS) transmission. The resource request sent at step 202 may be sent with a scheduling request for data transmission.

At step 204, the base station 102 determines and allocates resources for CSI-RS transmission. At step 206, the base station 102 sends to the Tx UE 150 the resource allocation for CSI transmission. This resource may be used jointly for transmission of data and CSI-RS from the Tx UE 150 to the Rx UE 152.

At step 208, the Tx UE 150 transmits, via the sidelink 156, a Sidelink Control Information (SCI) and a CSI-RS to the Rx UE 152. The CSI-RS may be embedded in the PSSCH. At step 210, the Rx UE 152 determines the CSI parameters (eg Channel Quality Indicator (CQI), Pre-coding Matrix Indicator (PMI) and Rank Indicator (RI)) based on the CSI-RS.

At step 212, the Rx UE 152 sends a request to the base station 102 for resources for CSI reporting. This may be in the form of a normal scheduling request (SR) or a special SR designed for CSI reporting. At step 214, the base station 102 determines and allocates resources for CSI reporting. At step 216, the base station 102 sends to the Rx UE 152 the resource allocation for CSI reporting. In step 216, the base station 102 may send a Downlink Control Information (DCI) to the Rx UE 152 carrying sidelink grant for the transmission of the CSI report.

At step 218, the Rx UE 152 transmits, via the sidelink 156, SCI and the CSI report to the Tx UE 150. Optionally, if the CSI is required at the base station 102, then at step 220 the Tx UE 150 transmits the acquired CSI to the base station 102.

The CSI acquisition process 200 includes a large number of transmissions in the form of request of resources for CSI-RS transmission (step 202), transmission of the CSI-RS (step 208), request of resources for CSI report transmission (step 212) and transmission of CSI report itself (step 218). In particular, process 200 includes two scheduling-request and grant reception from the base station 102. This may lead to a delay before the Tx UE 150 acquires valid CSI from the Rx UE 152 which are of particular concern for latency critical applications. Further, delays in the Tx UE 150 acquiring the CSI for link adaptation may lead to the CSI being "stale", ie out-of-date, no longer relevant or old. If the channel variations are quick, the channel may have already changed before being used in link adaptation.

Figure 4:
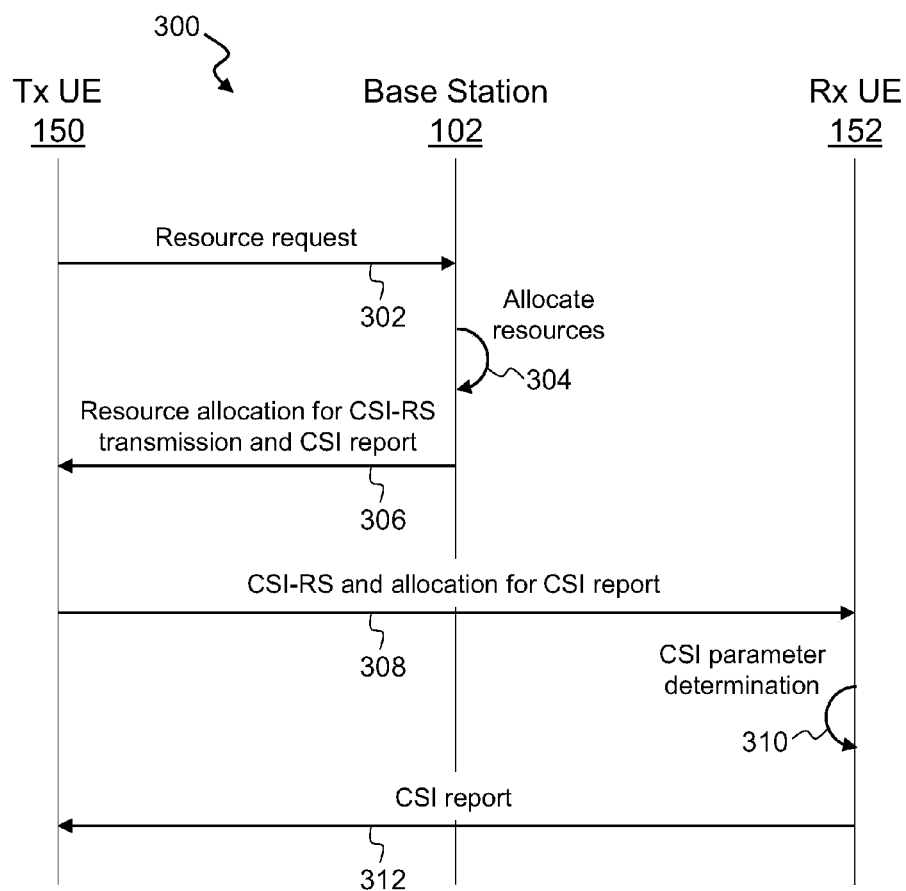
FIG. 4 shows a dataflow in a process of CSI acquisition with dynamic resource grants.

The two resources, one for CSI-RS transmission and one for CSI report transmission, may be scheduled in a single step. With reference to FIG. 4, a CSI acquisition process 300 comprises the Tx UE 150 sending, at step 302, a request to the base station 102 for resources for CSI transmission and CSI reporting. The resource request sent at step 302 may be sent with a scheduling request for data transmission.

At step 304, the base station 102 determines and allocates resources for CSI-RS transmission and CSI reporting. At step 306, the base station 102 sends to the Tx UE 150 a first resource allocation for CSI-RS transmission and a second resource allocation for CSI reporting. Ways in which the base station 102 may send both the resource allocation for CSI-RS transmission and CSI reporting together are discussed in greater detail below.

At step 308, the Tx UE 150 transmits, via the sidelink 156, an SCI, a CSI-RS and the resource allocation for CSI reporting to the Rx UE 152. SCI is transmitted over PSCCH, and indicates the resource for CSI-RS transmission. The first indicated resource from the base station 102 may be used by Tx UE 150 to send the CSI-RS. The CSI-RS resource elements may be embedded in data (eg PSSCH) to avoid creating standalone reference symbol transmission. The Tx UE 150 may send the second allocated resource from the base station in the SCI for the Rx UE 152 to transmit back the CSI report.

At step 310, the Rx UE 152 determines the CSI parameters, eg CQI, PMI and RI, based on the CSI-RS. At step 312, the Rx UE 152 transmits, via the sidelink 156, an SCI and the CSI report to the Tx UE 150 on the pre-allocated resources for CSI reporting. In other words, the second indicated resource from the base station 102, sent to the Rx UE 152 at step 308, may be used by the Rx UE 152 to transmit the CSI report. Optionally, if the CSI is required at the base station 102, then the Tx UE 150 transmits the acquired CSI to the base station 102.

In summary, in the CSI acquisition process 300, the Tx UE 150 receives the indication of two scheduled resources from the base station 102 as part of the its scheduling request for CSI-RS transmission. Then the Tx UE 150 indicates these two resources to the Rx UE 152 as part of CSI-RS transmission. Upon receiving this indication, the Rx UE can estimate CSI and transmits the CSI report on the pre-scheduled resources.

By allocating resources for CSI-RS transmission and CSI reporting at the same time in the CSI acquisition process 300, the Rx UE 152 does not need to request the resources from the base station 102 and hence there is no resource request (ie step 212) and resource grant (ie step 216) for the purpose of CSI reporting.

As set out above, in step 306 of the CSI acquisition process 300, the base station 102 indicates both the CSI-RS transmission and CSI reporting to the Tx UE 150 together.

In some examples of sending the CSI-RS transmission and CSI reporting to the Tx UE 150 together, the base station 102 may indicate the resources for CSI-RS transmission and the CSI reporting in a single DCI by using a DCI format which is capable of carrying more than one resource scheduling. For example, in Mode 1 without periodic resource allocation in the form of semi-persistent scheduling (SPS) or configured grant (CG), the base station 102 will determine the scheduling for each transport block (TB). The resources for multiple repetitions of a single transport block may be scheduled and provided jointly in a single DCI from a base station to a Tx UE. Similarly, a single SCI can indicate these resources from a Tx UE to a Rx UE. Similar to the scheduling of multiple repetitions of a single transport block, the resources for more than one TB may be jointly scheduled by the base station 102 and there may be a single DCI which sends these allocations to the Tx UE 150. More than one resource could be related to the repetitions of a single TB or the transmission of multiple TBs. Advantageously, the Tx UE does not have to blindly decode a variety of DCI formats, which would otherwise lead to a large processing burden.

In some examples of sending the CSI-RS transmission and CSI reporting to the Tx UE 150 together, DCI formats arranged to schedule multiple time-frequency resources may be used. The DCI may indicate the purpose of the DCI, multiple repetition or multiple TBs, and/or CSI-RS transmission combined with CSI reporting. An explicit indication may be included in the DCI regarding the purpose of multiple resources allocated in the DCI. This indication may be in the form of CSI indication, which may indicate go-ahead for CSI-RS transmission and the purpose of additional time-frequency resources as the resources reserved for CSI reporting.

In some examples of sending the CSI-RS transmission and CSI reporting resources from the Tx UE 150 to the Rx UE 152 together, SCI formats arranged to schedule multiple time-frequency resources may be used to transmit the CSI-RS from the Tx UE 150 to Rx UE 152 on a first scheduled resource and then the CSI report may be transmitted on a second scheduled resource from the Rx UE 152 to the Tx UE 150. Similar to DCI, SCI may schedule multiple resources. These resources may be either be for multiple repetitions of the same TB or for the transmission of multiple TBs. These SCI formats can be used by the Tx UE 150 to indicate the CSI-RS transmission resource and the CSI reporting resource to the Rx UE 152. A first scheduled resource may be used by the Tx UE 150 to transmit (along with data) the CSI-RS to the Rx UE 152, and a second scheduled resource may be used by the Rx UE 152 to transmit the CSI report based upon the received CSI-RS symbols in the first transmission to the Tx UE 150. Advantageously, the blind decode complexity for the Rx UE is not increased, for example, due to additional format.

It is to be understood that although the terminology used is of an SCI transmitted from a Tx UE to a Rx UE carrying the information about the two scheduled resources, the disclosed scheme is independent of the detailed SCI design and fully applicable to a variety of SCI designs whether it is a single stage SCI design carrying all the information in a single SCI or a two-stage SCI design, where the SCI information may be split in two stages. For the two stage SCI design, the first stage is meant to facilitate sensing by other users and hence carries mainly the time-frequency resource information where PSSCH will be transmitted. The second stage then carries the other control parameters necessary to decode the data (eg PSSCH).

If two-stage SCI design is in place, the Tx UE may transmit the two resource allocations in the first SCI stage. This would pre-reserve both of these resource allocations. Denoting a time delay between transmission of a first SCI from a Tx UE to a Rx UE and transmission of a second SCI and CSI report from the Rx UE to the Tx UE as CSI_Report_Time_Budget, a time window where resources can be reserved in a first stage SCI may be longer than the CSI_Report_Time_Budget. This ensures that no other UE in the vicinity acquires the resources in the intervening time while the resources have been pre-allocated by the base station for the CSI report transmission.

The two resources, one for CSI-RS transmission and the other for CSI report transmission, may be sent in a single DCI and a single SCI respectively as discussed in the previous embodiments. In some examples, the first resource may be transmitted in the control channel and the second resource may be transmitted in the data channel. For example, the SCI may carry the resource allocated for CSI-RS transmission. The CSI-RS allocated resource, in turn, may have resource elements for CSI-RS and carry the CSI reporting resource for the Rx UE. This may be particularly advantageous when indicating CSI reporting resource from the Tx UE 150 to the Rx UE 152 as it makes use of CSI-RS resource to transmit the second allocated resource, increasing the utilisation efficiency. Further, an SCI carrying a single resource indication can be used, thus circumventing the need for large SCIs which can accommodate two resource allocation indications.

Notably, as the Rx UE 152 does not need to communicate directly with the base station 102 to request any resources and the Tx UE 150 is able to get the CSI reporting resources from the base station 102, the CSI acquisition process 300 may be used by an out of coverage Rx UE 152. Accordingly, the CSI acquisition process 300 can be used in a partial coverage scenario in which the Tx UE 150 is in-coverage of the base station 102 but the Rx UE 152 is out of coverage. This is advantageous in reducing CSI acquisition latency as the Rx UE 152 does not need to perform channel sensing and may make use of the resources configured by the base station 102. Further, robustness is improved as base station allocated resources have a lower chance of interference compared to resources sensed by a UE.

Figure 5:
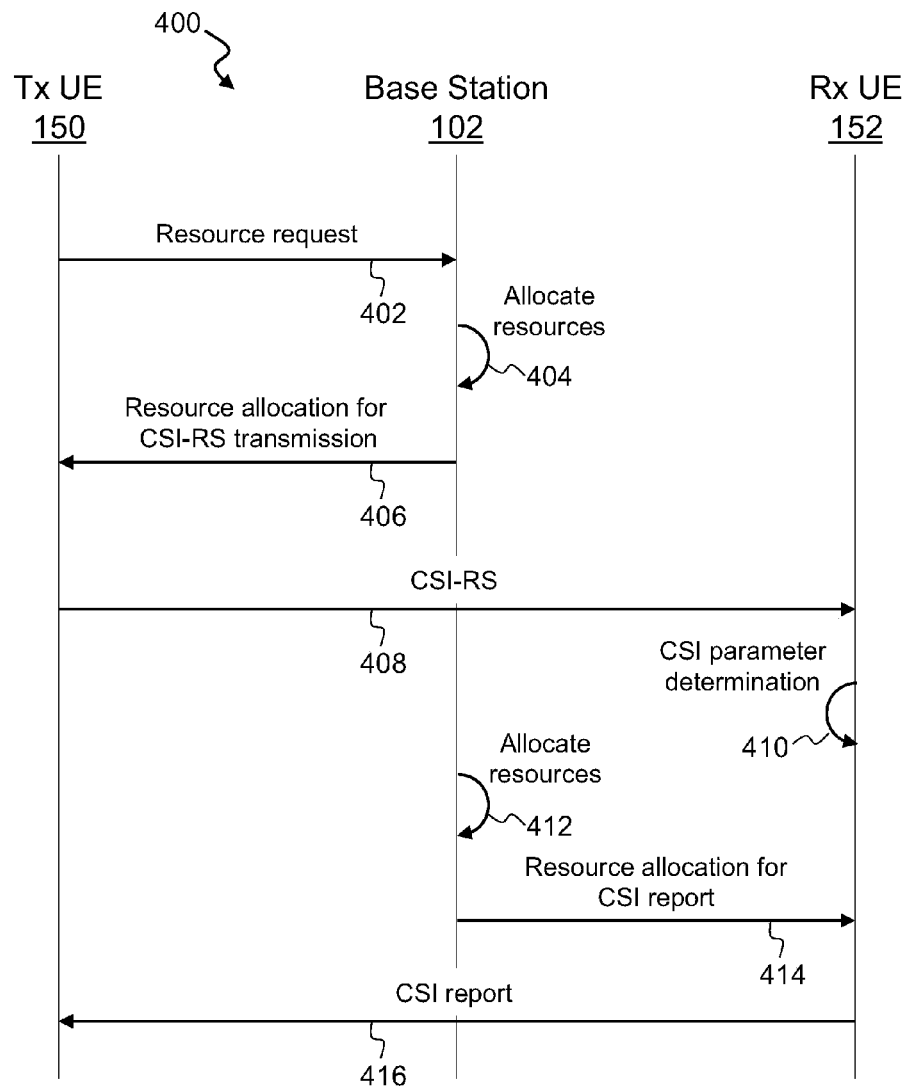
FIG. 5 shows a dataflow in a process of CSI acquisition with dynamic resource grants.

In some embodiments, the base station 102 schedules resources for the Rx UE 152 to send the CSI report after receiving a resource request for CSI-RS transmission, without waiting to receive an explicit request from the Rx UE 152 to transmit CSI report. With reference to FIG. 5, a CSI acquisition process 400 comprises the Tx UE 150 sending, at step 402, a request to the base station 102 for resources for CSI transmission. The resource request sent at step 402 may be sent with a scheduling request for data transmission.

At step 404, the base station 102 determines and allocates resources for CSI-RS transmission. At step 406, the base station 102 sends to the Tx UE 150 the resource allocation for CSI-RS transmission. At step 408, the Tx UE 150 transmits, via the sidelink 156, an SCI and a CSI-RS to the Rx UE 152.

At step 410, the Rx UE 152 determines the CSI parameters, eg CQI, PMI and RI, based on the CSI-RS. At step 412, the base station 102 determines and allocates resources for CSI reporting. At step 414, the base station 102 sends to the Rx UE 152 the resource allocation for CSI reporting. In step 414, the base station 102 may send a DCI to the Rx UE 152 carrying sidelink grant for the transmission of the CSI report.

At step 416, the Rx UE 152 transmits, via the sidelink 156, an SCI and the CSI report to the Tx UE 150 on the resources allocated by the base station 102 at step 412.

Accordingly, the overhead of a scheduling request from the Rx UE 152 to the base station 102 and the associated latency is reduced. The base station 102 may allocate and send resources for sending the CSI report (ie steps 412 and 414) any time after the resource request from the Tx UE 150 at step 402, for example before or after the Tx UE 150 sends the CSI-RS (ie step 408) or the Rx UE 152 determines the CSI parameters (ie step 410).

Figure 6:
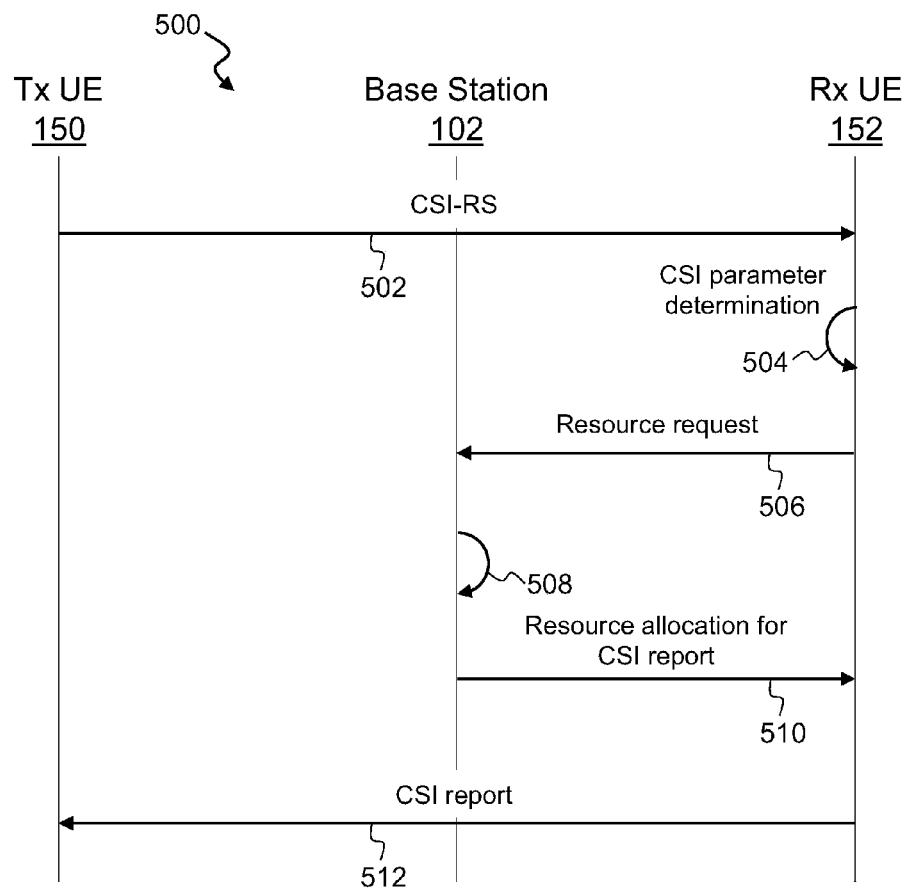
FIG. 6 shows a dataflow in a process of CSI acquisition with periodic resource allocation to the transmitter User Equipment.
Figure 7:
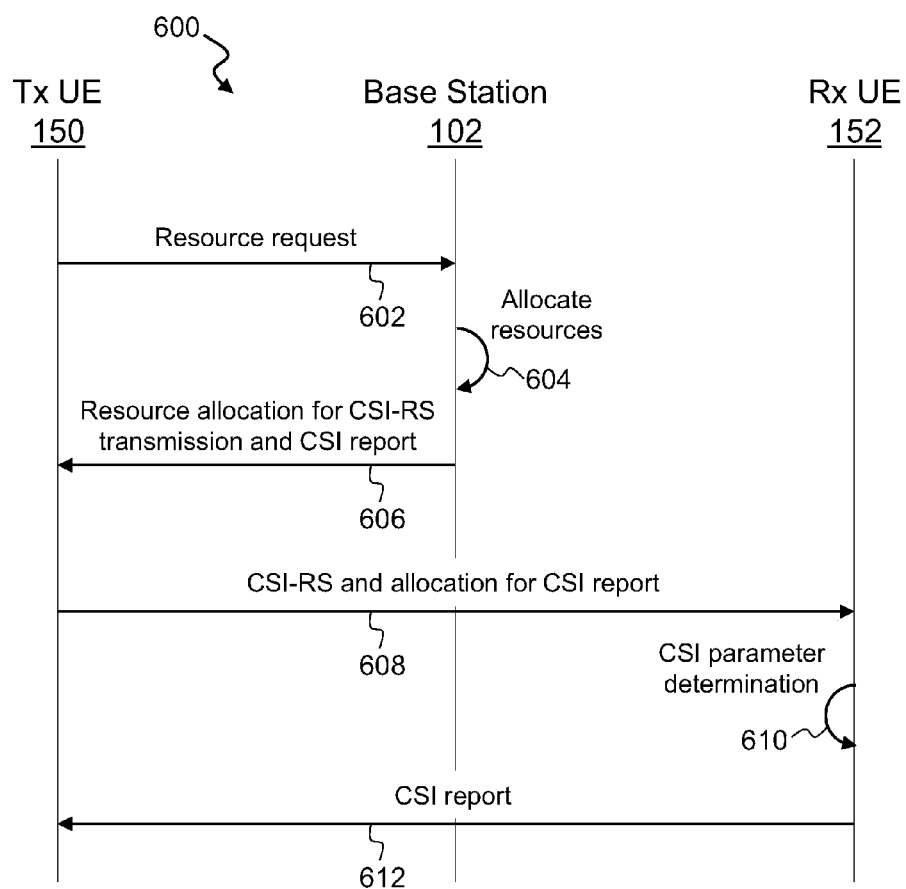
FIG. 7 shows a dataflow in a process of CSI acquisition with periodic resource allocation to the receiver User Equipment.
Figure 8:
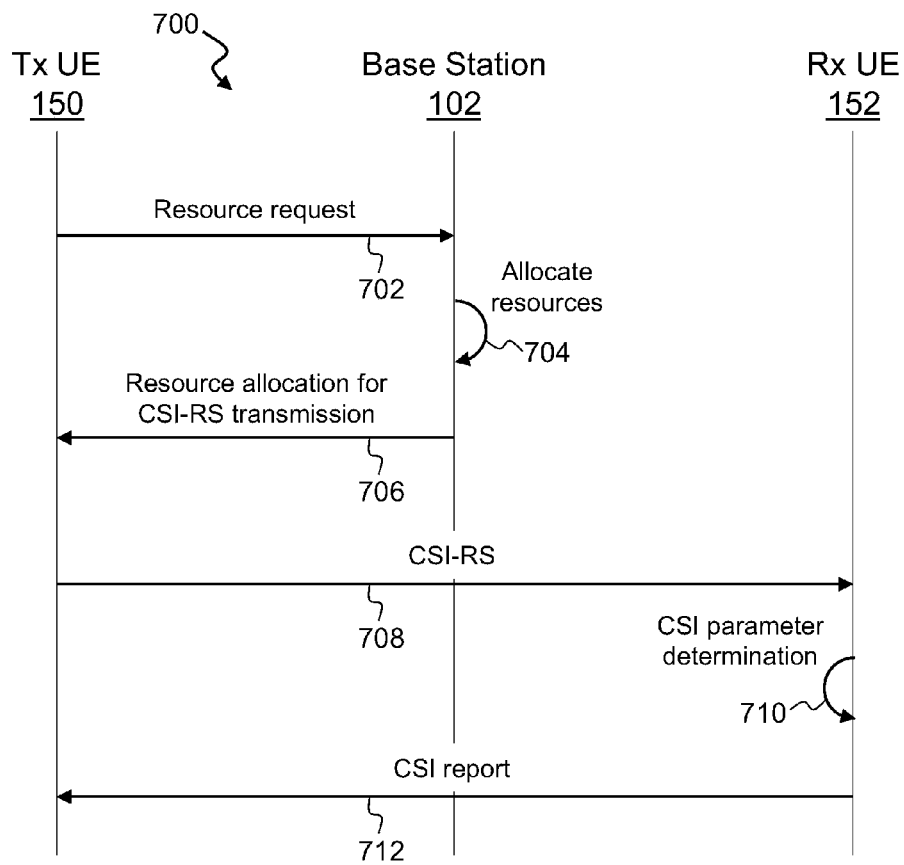
FIG. 8 shows a dataflow in a process of CSI acquisition with periodic resource allocation to the receiver User Equipment.

In Mode 1, periodic resources may be allocated to the Tx UE 150 and/or the Rx UE 152. The allocation of such periodic resources may be in the form of semi-persistent scheduling (SPS), some variations of NR-Uu UL configured grant (CG) Type 1, Type 2 or some other mechanism. The CSI reporting strategy can vary depending on which of the Tx UE 150 and/or the Rx UE 152 has been allocated periodic resources. Accordingly, different CSI acquisition process are discussed below in greater detail with reference to:

FIG. 6 when only the Tx UE 150 has periodic resources allocated;
FIGS. 7 and 8 when only the Rx UE 152 has periodic resources allocated; and
FIG. 9 when both the Tx UE 150 and the Rx UE 152 have periodic resources allocated.

With reference to FIG. 6, a CSI acquisition process 500 comprises the Tx UE 150 sending, at step 502, a CSI-RS over periodically allocated resources to the Rx UE 152. The Tx UE 150 may transmit CSI-RS on the periodic allocated resources when it has some data to transmit on that resource, as transmission of stand-alone CSI-RS may result in resource waste.

As sidelink transmissions may have fully in-coverage, fully out-of-coverage, and partial coverage scenarios, in some embodiments, for a Tx UE configured with periodic resources no SCI is transmitted with periodic resources at step 502. In other embodiments, SCI is transmitted even with periodic resources at step 502 to facilitate sensing at neighbouring UE devices. When SCI is transmitted, CSI indication (ie CSI-RS transmission and CSI report request) may be sent in the SCI. For CSI-RS transmissions without SCI, the CSI indication may be sent in the PSSCH from the Tx UE 150 to the Rx UE 152, and the Rx UE 152 may be arranged to estimate the presence of CSI-RS and, if detected, consider this as CSI report request.

At step 504, the Rx UE 152 determines the CSI parameters, eg CQI, PMI and RI, based on the CSI-RS. At step 506, the Rx UE 152 sends a request to the base station 102 for resources for CSI reporting. This may be in the form of a normal SR or a special SR designed for CSI. At step 508, the base station 102 determines and allocates resources for CSI reporting. At step 510, the base station 102 sends to the Rx UE 152 the resource allocation for CSI reporting. In step 510, the base station 102 may send a DCI to the Rx UE 152 carrying sidelink grant for the transmission of the CSI report. At step 512, the Rx UE 152 transmits, via the sidelink 156, an SCI and the CSI report to the Tx UE 150.

The CSI acquisition process 500 enables CSI acquisition at a Tx UE with periodic resources allocated by transmitting CSI-RS without making an explicit request for resources from a base station in order to transmit the CSI-RS. Accordingly, the CSI acquisition process 500 reduces latency and reduces control overhead, thereby improving efficiency of resource usage.

With reference to FIG. 7, a CSI acquisition process 600 comprises the Tx UE 150 sending, at step 602, a request to the base station 102 for resources for CSI transmission and CSI reporting. The resource request sent at step 602 may be sent with a scheduling request for data transmission.

At step 604, the base station 102 determines and allocates resources for CSI-RS transmission and CSI reporting. At step 606, the base station 102 sends to the Tx UE 150 a first resource allocation for CSI-RS transmission and a second resource allocation for CSI reporting. Ways in which the base station 102 may send both the resource allocation for CSI-RS transmission and CSI reporting together are discussed in greater detail above with reference to step 306 of the CSI acquisition process 300.

At step 608, the Tx UE 150 transmits, via the sidelink 156, an SCI, a CSI-RS and the resource allocation for CSI reporting to the Rx UE 152. The first indicated resource from the base station 102 may be used by Tx UE 150 to send the CSI-RS. The CSI-RS resource elements may be embedded in data (eg PSSCH) to avoid creating standalone reference symbol transmission.

At step 610, the Rx UE 152 determines the CSI parameters, eg CQI, PMI and RI, based on the CSI-RS. At step 612, the Rx UE 152 transmits, via the sidelink 156, an SCI and the CSI report to the Tx UE 150 on the pre-allocated resources for CSI reporting. In other words, the second indicated resource from the base station 102, sent to the Rx UE 152 at step 608, may be used by the Rx UE 152 to transmit the CSI report. Optionally, if the CSI is required at the base station 102, then the Tx UE 150 transmits the acquired CSI to the base station 102.

The CSI acquisition process 600, which may be carried out when only the Rx UE 152 has periodic resources allocated, is substantially the same as the CSI acquisition process 300, which may be carried out when no periodic resources are allocated to either the Tx UE 150 or the Rx UE 152.

With reference to FIG. 8, a CSI acquisition process 700 comprises the Tx UE 150 sending, at step 702, a request to the base station 102 for resources for CSI transmission and CSI reporting. The resource request sent at step 702 may be sent with a scheduling request for data transmission.

At step 704, the base station 102 determines and allocates resources for CSI-RS transmission. At step 706, the base station 102 sends to the Tx UE 150 the resource allocation for CSI-RS transmission.

At step 708, the Tx UE 150 transmits, via the sidelink 156, an SCI and a CSI-RS to the Rx UE 152. The CSI-RS may be embedded in a PSSCH. At step 710, the Rx UE 152 determines the CSI parameters, eg CQI, PMI and RI, based on the CSI-RS. At step 712, the Rx UE 152 transmits, an SCI and the CSI report to the Tx UE 150 over the periodically allocated resources of the Rx UE 152.

CSI reporting takes place on dynamically assigned resources in the CSI acquisition process 600 whereas it takes place on the Rx UE's periodic assigned resources in the CSI acquisition process 700. In some examples, the Tx UE 150 may request, at step 602 of the CSI acquisition process 600, the base station 102 to grant the resources for CSI-RS and CSI report transmission in one single grant. However, the base station 102 may be configured to cause the CSI report to be sent over the periodic resources if the Rx UE 152 has periodic resource allocation. As such, the base station 102 may send the resources for CSI-RS transmission to the Tx UE 150 without the requested resources for CSI reporting, in substantially the same way as step 706 of the CSI acquisition process 700. The CSI acquisition process would then continue in substantially the same way as steps 708 to 712 of the CSI acquisition process 700.

Figure 9:
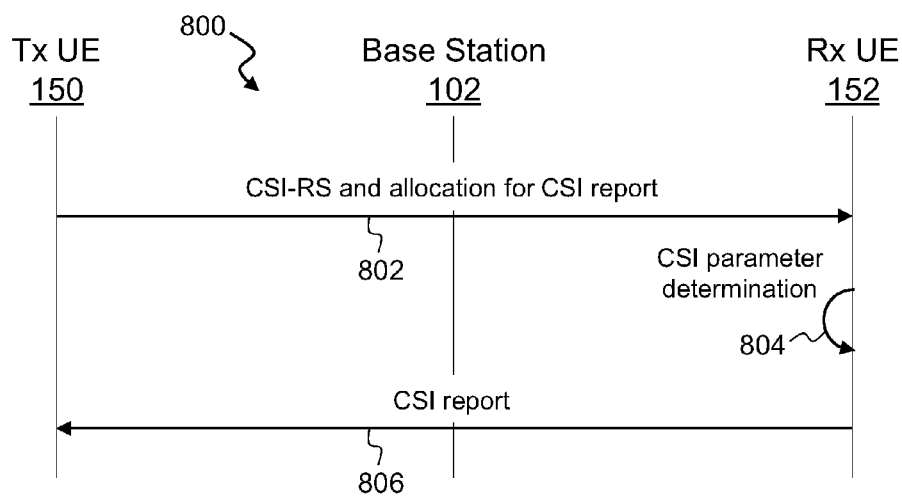
FIG. 9 shows a dataflow in a process of CSI acquisition with periodic resource allocation to the receiver User Equipment and the transmitter User Equipment.

With reference to FIG. 9, a CSI acquisition process 800 comprises the Tx UE 150 sending, at step 802, a CSI-RS to the Rx UE 152 over the periodically allocated resources of the Tx UE 150. The CSI-RS may be embedded in a PSSCH.

At step 804, the Rx UE 152 determines the CSI parameters, eg CQI, PMI and RI, based on the CSI-RS. At step 806, the Rx UE 152 transmits, the CSI report to the Tx UE 150 over the periodically allocated resources of the Rx UE 152. An SCI may precede the periodically allocated resource usage following the configuration of periodically allocated resources. Thus if SCI is to be transmitted, it may be transmitted as part of step 802 and step 806, before the actual periodic resource usage occurs.

As sidelink transmissions may have fully in-coverage, fully out-of-coverage, and partial coverage scenarios, in some embodiments, for a Tx UE configured with periodic resources no SCI is transmitted with periodic resources at step 802. In other embodiments, SCI is transmitted even with periodic resources at step 802 to facilitate sensing at neighbouring UE devices. When SCI is transmitted, CSI indication (ie CSI-RS transmission and CSI report request) may be sent in the SCI. For CSI-RS transmissions without SCI, the CSI indication may be sent in the PSSCH from the Tx UE 150 to the Rx UE 152, and the Rx UE 152 may be arranged to estimate the presence of CSI-RS and, if detected, consider this as CSI report request.

In the CSI acquisition process 800, no resource requests are made to the base station 102, eg CSI-RS transmission request (and associated grant) and CSI report transmission request (and associated grant), reducing latency and control overhead, thereby improving efficiency of resource usage.

Whilst sending the CSI report to the Tx UE 150 along with data would lead to more efficient resource usage, if the Rx UE 152 always had to wait for the data to be able to transmit CSI report, excessive delays in CSI report transmission may render the CSI information outdated. Further, the Tx UE 150 may urgently require the CSI as it may have more data in its buffer to be transmitted, or the data may have higher Quality of Service (QoS).

In the CSI acquisition processes 200, 300, 400, 500, 600, 700, 800, the Rx UE 152 may transmit the CSI report by itself or with data over the allocated resources. The Rx UE 152 may be arranged to send the CSI report to the Tx UE 150 without any data if there is no data to send during a time window, starting from when the Rx UE 152 receives the CSI-RS or determines the CSI parameters. If the Rx UE 152 receives data to transmit within the time window, the Rx UE 152 may transmit the data and CSI report jointly over the allocated resource. If the Rx UE 152 does not have any data to transmit, the Rx UE 152 still transmits CSI report within the time window.

The time window may be part of CSI pre-configuration and may be set up as part of CSI initial configurations. The time window may be defined in absolute time units (eg milliseconds), a number of time slots, or a number of transmissions actually transmitted on the resources. To increase flexibility, the time window may be a range with a lower limit and an upper limit during which the CSI report is sent.

Each time the Tx UE 150 obtains a CSI estimate, it may be configured to update the CSI estimate at the base station 102 by sending the most recently obtained report to the base station 102 on the connection 154. In some examples, a filtered CSI estimate may be sent to the base station 102 from the Tx UE 150, in which the filtered CSI estimate may be a combination of a plurality of CSI reports received from the Rx UE 152.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (eg, libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or 'including' does not exclude the presence of other elements.

What is claimed is:

1. A method of receiving Channel State Information (CSI) at a transmitter User Equipment, the method comprising the steps of:
   transmitting, to a base station, a request for resources for transmission of a Channel State Information Reference Signal (CSI-RS);
   receiving, from the base station, a first resource allocation for CSI-RS transmission and a second resource allocation for a CSI report;
   transmitting, to a receiver User Equipment, a CSI-RS using the first resource allocation, and a sidelink control information (SCI) having the second resource allocation; and
   receiving, from the receiver User Equipment, the CSI report using the second resource allocation determined based on the CSI-RS;
   wherein the receiving, from the base station, the first resource allocation for CSI-RS transmission and the second resource allocation for a CSI report, comprises:
   receiving, from the base station, a Downlink Control Information (DCI) carrying more than one resources relating to a repetition of a single Transport block (TB) or transmissions of multiple TBs, wherein an indication of the second resource allocation is transmitted by the transmitter UE to the receiver UE using the first resource allocation.

2. The method of claim 1, wherein the CSI report is based on the CSI-RS.

3. The method of claim 1, wherein receiving the CSI report comprises receiving using a periodically allocated resource of the receiver User Equipment.

4. The method of claim 1, wherein receiving the CSI report comprises receiving using a dynamically allocated resource.

5. A user equipment (UE), comprising a transceiver, a memory and a processor coupled to the transceiver and the memory configured to store a computer program executable on the processor, wherein:
   the memory is configured to store the computer program, and the processor is configured to call and run the computer program stored in the memory and cooperate with the transceiver to execute the method of claim 1.

* * * * *